United States Patent
Ribi

(10) Patent No.: US 10,921,176 B2
(45) Date of Patent: Feb. 16, 2021

(54) WIM SENSOR AND METHOD FOR PRODUCING THE WIM SENSOR

(71) Applicant: Kistler Holding AG, Winterthur (CH)

(72) Inventor: Adrian Ribi, Winterthur (CH)

(73) Assignee: Kistler Holding AG, Winterthur (CH)

(*) Notice: Subject to any disclaimer, the term of this patent is extended or adjusted under 35 U.S.C. 154(b) by 150 days.

(21) Appl. No.: 16/215,950

(22) Filed: Dec. 11, 2018

(65) Prior Publication Data

US 2019/0186983 A1      Jun. 20, 2019

(30) Foreign Application Priority Data

Dec. 15, 2017   (EP) .................................. 17207636.6

(51) Int. Cl.
| | |
|---|---|
| *G01G 3/13* | (2006.01) |
| *G01L 1/04* | (2006.01) |
| *G01L 1/16* | (2006.01) |
| *G01G 19/02* | (2006.01) |

(52) U.S. Cl.
CPC ............ *G01G 19/024* (2013.01); *G01G 3/13* (2013.01); *G01L 1/04* (2013.01); *G01L 1/16* (2013.01)

(58) Field of Classification Search
CPC .... G01L 1/16; G01L 1/04; G01G 3/13; G01G 19/024
USPC ............................................................ 177/1
See application file for complete search history.

(56) References Cited

U.S. PATENT DOCUMENTS

| | | | |
|---|---|---|---|
| 5,265,481 A | 11/1993 | Sonderegger et al. | |
| 5,915,267 A * | 6/1999 | Kim ....................... | G01R 29/22 73/1.15 |
| 8,738,244 B2 | 5/2014 | Lenz et al. | |
| 9,304,032 B2 | 4/2016 | Cornu et al. | |
| 9,347,816 B2 | 5/2016 | Cornu et al. | |
| 9,372,110 B2 * | 6/2016 | Cornu .................. | G01G 19/024 |
| 9,488,517 B2 * | 11/2016 | Cornu ..................... | G08G 1/02 |
| 9,683,883 B2 * | 6/2017 | Rettig ................. | G01G 19/047 |
| 9,804,017 B2 | 10/2017 | Cornu et al. | |
| 9,851,241 B2 | 12/2017 | Hofmann et al. | |

(Continued)

FOREIGN PATENT DOCUMENTS

| | | |
|---|---|---|
| JP | S61050013 | 3/1986 |
| JP | AH04315015 | 11/1992 |

(Continued)

OTHER PUBLICATIONS

European Search Report, EP 17207636.6-1001, dated Jul. 3, 2018, 8 pages.

(Continued)

*Primary Examiner* — Jacques M Saint Surin

(74) *Attorney, Agent, or Firm* — Dority & Manning, P.A.

(57) ABSTRACT

A WIM sensor for determining wheel loads of a vehicle on a roadway segment during the passage of a wheel of the vehicle includes an elongated hollow profile that defines an enclosed first space. A plurality of piezoelectric measuring elements are disposed within the first space. A support element is arranged in the first space and secures therein the plurality of piezoelectric measuring elements. An electronic element is arranged in the first space and secured by the support element. An electric charge conductor is disposed in the first space and electrically connects a force-receiving surface of a piezoelectric measuring element to the electronic element.

16 Claims, 4 Drawing Sheets

(56) References Cited

U.S. PATENT DOCUMENTS

| | | | |
|---|---|---|---|
| 9,880,045 B2 * | 1/2018 | Hanson | G07C 5/08 |
| 10,041,826 B2 * | 8/2018 | Kneubuhl | G01L 1/16 |
| 10,378,974 B2 * | 8/2019 | Pfluger | G08G 1/02 |
| 10,640,936 B2 * | 5/2020 | Simons | G01G 19/03 |
| 2002/0103613 A1 | 8/2002 | Maher et al. | |
| 2011/0127090 A1 * | 6/2011 | Vijayaraghavan | G01G 19/03 |
| | | | 177/133 |
| 2014/0005569 A1 | 1/2014 | Miethke | |
| 2014/0345955 A1 | 11/2014 | Cornu et al. | |

FOREIGN PATENT DOCUMENTS

| | | | |
|---|---|---|---|
| JP | 06347316 | | 12/1994 |
| JP | A2001525539 | | 12/2001 |
| JP | A2008293541 | | 12/2008 |
| JP | 2013545973 | | 12/2013 |
| JP | 2014021129 | | 2/2014 |
| WO | WO9928720 | | 6/1999 |
| WO | WO2013017768 | * | 2/2013 |
| WO | WO 2013017768 | | 7/2013 |

OTHER PUBLICATIONS

Japanese Office Action and English Translation Thereof, JP Application No. 2018-234263, dated Jan. 9, 2020, 20 pages.

* cited by examiner

WIM SENSOR AND METHOD FOR PRODUCING THE WIM SENSOR

CROSS-REFERENCE TO RELATED APPLICATIONS

Not applicable

STATEMENT REGARDING FEDERALLY SPONSORED RESEARCH OR DEVELOPMENT

Not applicable

TECHNICAL FIELD

The invention relates to a WIM sensor and to a method for producing the WIM sensor.

BACKGROUND

Weigh in Motion (WIM) sensors are used in the field of transport for determining the load of a wheel of a vehicle, briefly referred to as load; or for determining the number of passages of wheels over a roadway segment, for example. By load is meant the weight force, briefly referred to as force, that acts onto a segment of the roadway via a wheel due to the mass of a vehicle. Vehicle refers to a vehicle or a combination of vehicles consisting of a tractor and one or more trailers.

The data determined in this way may serve to initiate measures that are appropriate, for example, to prevent damage of the roadway segment by a load higher than the load admitted for that roadway segment, to determine use-dependent maintenance intervals of the roadway, to determine payments that are dependent on the load or the number of wheels of a vehicle, and to increase road safety.

WIM sensors are embedded in the road surface of a roadway segment and in a longitudinal direction with respect to the direction of travel a track of a vehicle is crossed by several WIM sensors that are inserted in the road surface next to each other along the direction of travel so that one WIM sensor each crosses a wheel track of a vehicle wherein the WIM sensor is arranged in the surface of the roadway segment flush with the road surface of that roadway segment. Generally, the WIM sensor is formed with an elongated profile.

By wheel track is meant the trajectory of a wheel of the vehicle on the road surface when the vehicle traverses. By track is meant the totality of all wheel tracks of the vehicle.

Also, an embodiment is known in which the complete track of the vehicle is crossed by a single elongated WIM sensor.

Typically, a piezoelectric measuring element of a \MM sensor is a piezoelectric material on the outer surface of which an electric charge is generated that is proportional to the load acting on the piezoelectric material. Charge signal refers to electric charges conducted from the surfaces of the piezoelectric material by appropriate electrical conductors. This charge signal is amplified in a charge amplifier and converted into a charge amplifier signal.

Therefore, detecting the charge signals of individual piezoelectric measuring elements or groups of piezoelectric measuring elements requires a very high effort. Thus, a charge amplifier must be provided for each piezoelectric measuring element or group of piezoelectric measuring elements. In addition, each charge amplifier signal must be conducted separately to an electronic evaluation unit.

There are different types of wheels used on different vehicles. Thus, the types of wheels include the single wheel, dual wheel or super single wheel. To differentiate between a wheel, a dual wheel or a super single wheel during the crossing of a vehicle, individual piezoelectric measuring elements must be aligned in the WIM sensor at a suitably small distance from each other along the longitudinal axis thereof; wherein the piezoelectric measuring elements produce a signal that is proportional to the force acting on them. The signals of these piezoelectric measuring elements must be detected individually and must be included in an evaluation individually to determine the wheel type.

An unambiguous characterization of the wheel types of crossing wheels is indispensable, for example, for future applications of WIM sensors, and also for determining the type of vehicle belonging to the wheel. These applications include without limitation:

Detecting a vehicle type

Direct punishment of overloaded vehicles based on the admissible total weight for the vehicle type on the basis of a WIM measurement at full traveling speed.

Direct punishment of vehicles exceeding the speed limit on the basis of the admissible maximum speed for the vehicle type based on a WIM measurement at full traveling speed.

Checking for consistency of the data on the vehicle's vehicle type stored in a toll system.

Load-dependent toll payment by vehicle type based on a WIM measurement at full traveling speed.

Load-dependent payment by vehicle type based on a WIM measurement in industrial applications (port, mines, gravel plant, etc.).

For the points mentioned above, the requirements regarding measurement accuracy of WIM systems are very high. Thus, a recommendation of the International Organization of Legal Metrology (OIML) in its standard OIML R-134a includes a classification of WIM systems with respect to their accuracy. In the aforementioned applications, the specification of the measurement accuracy as well as a classification into a high accuracy class are of extraordinary importance for the use of WIM sensors.

U.S. Pat. No. 5,265,481A, which is hereby incorporated herein by this reference for all purposes, discloses a WIM sensor that includes a plurality of piezoelectric measuring elements, briefly referred to as piezoelements, arranged in a hollow profile in a longitudinal direction. A piezoelement consists of piezo discs inserted between force introduction segments. The piezoelements are connected to a signal processing unit so that it is possible to contact an individual piezoelement or a group of piezoelements in parallel. Furthermore, in a mounting process known from U.S. Pat. No. 5,265,481A, an elastic chain consisting of a film with the piezoelements mounted thereon along with the signal conductors is inserted into a clamped hollow profile. Electronic components, such as a preamplifier, may be arranged in the hollow profile laterally next to a piezoelement.

However, the arrangement mentioned above presents a number of disadvantages. There is the disadvantage that the piezoelement is a multi-piece structure in which a force introduction segment, a piezo disc, an electrically conductive film, another piezo disc, and another force introduction segment are all bonded to each other by an adhesive. A stack containing several piezoelements that are arranged on the electrically conductive film is called an elastic chain. The elastic chain can be mounted by pulling the elastic chain into the hollow profile. The elastic properties of the adhesive are detrimental to the measurement accuracy and linearity of the signal of the piezoelement. Furthermore, inserting further electronic components in addition to the piezoelements is difficult because these must be inserted in a synchronous manner to prevent tearing of signal cables between the piezoelements and the electronic components. In addition, separate cables must be led from each piezoelement through the hollow profile to be able to evaluate signals of individual piezoelements. Due to these cables, the threading of the elastic chain consisting of piezoelements into the hollow profile presents a complex task during manufacturing of the WIM sensor. The complex installation requires increased effort and imposes high costs.

Exemplary Objects and Summary of the Invention

As used herein, measurement accuracy refers to the measurement accuracy in determining the wheel load exerted by a wheel of a crossing vehicle on a piezoelectric measuring element of a WIM sensor. An increase in measurement accuracy is achieved by reducing systematic errors in determining the wheel load. Once wheel load values have been determined repeatedly from the same wheel, an increase in measurement accuracy is achieved by reducing the dispersion of the wheel load values.

One of the objects of the present invention is to provide a WIM sensor that makes efficient use of space in the hollow profile of the WIM sensor. Another object is to increase the measurement accuracy of the WIM sensor. A further object is to provide a WIM sensor with a structure that is simple and yet remains completely functional. Still another object is to provide a low-cost manufacturing process for a WIM sensor.

At least one of these objects is achieved by the features described below.

The invention relates to a WIM sensor for determining wheel loads of a vehicle on a roadway segment during the passage of a wheel of the vehicle; which WIM sensor is arranged in the roadway segment in the roadway surface flush with the roadway surface of the roadway segment. The WIM sensor includes a hollow profile having an elongated shape extending along a longitudinal axis thereof. This hollow profile encloses at least a first space. A plurality of piezoelectric measuring elements are arranged in said first space and disposed to extend along said longitudinal axis. Each of said piezoelectric measuring elements is defined in part by a first force-receiving surface and in part by a second force-receiving surface disposed opposite the first force-receiving surface. Wheel loads of moving vehicles traversing the profile act on said piezoelectric measuring elements during the passage of the wheel of the vehicle over the WIM sensor. Each piezoelectric measuring element generates electric charges on the first force-receiving surface and on the second force-receiving surface that are proportional to the effective wheel load. At least one support element is arranged in the first space and configured and disposed to secure at least one piezoelectric measuring element. At least one electronic element also is arranged in the first space, and the support element is configured and disposed to secure at least one electronic element. At least one electric charge conductor is arranged in the first space and configured and disposed so as to electrically connect the electronic element to at least one force-receiving surface. The electric charge conductor conducts a charge signal, which refers to the electric charge conducted in an electric charge conductor, from the at least one force-receiving surface to the electronic element.

A prerequisite for the detection of a wheel type such as a single wheel, a dual wheel or a super single wheel is a suitably short distance of less than 70 mm, advantageously 50 mm, of the individual piezoelectric measuring elements or groups of piezoelectric measuring elements in the longitudinal direction of the WIM sensor as well as an evaluation of the signals of the individual piezoelectric measuring elements or groups of piezoelectric measuring elements. The longitudinal direction refers to the direction of the largest dimension of the WIM sensor; typically wherein the WIM sensor is arranged in the roadway with its longitudinal direction corresponding to a direction that is perpendicular to the track of a wheel. The high number of charge amplifiers required, one per each piezoelectric measuring element, must be accommodated in a manner saving as much space as possible. For this purpose, the free space between the individual piezoelectric measuring elements is used in which an electronic element is arranged in an advantageous embodiment. In an advantageous embodiment, the space-saving arrangement of the electronic elements conjointly with the piezoelectric measuring elements in a space of the hollow profile is achieved by securing the electronic element between the individual piezoelectric measuring elements by means of a support element. Furthermore, the piezoelectric measuring elements are also secured by means of the support element.

At least one charge amplifier and at least one analog to digital converter, briefly A/D converter, are arranged on the electronic element. In a presently preferred embodiment, the number of charge amplifiers and A/D converters arranged on the electronic element corresponds to the number of adjacent piezoelectric measuring elements.

In addition, optimal space utilization is achieved by the fact that the charge signal of each of the piezoelectric measuring elements or each group of piezoelectric measuring elements is converted into a proportional voltage signal by the charge amplifier and is converted into a digital charge signal by the A/D converter. Here, a group of piezoelectric measuring elements refers to a group that consists of one or more piezoelectric measuring elements electrically connected in parallel and generating a single, common signal under a load.

In an evaluation element that is arranged in the WIM sensor a variety of charge signals, one per each piezoelectric measuring element or one per each group of piezoelectric measuring elements, must be available. Due to the characteristics of digital data transmission, the number of electrical signal conductors used for transmission is reduced as compared to the analog transmission of the charge signals of the individual piezoelectric measuring elements that is described in U.S. Pat. No. 5,265,481A. A particular advantage of digital signals over analog signals as used in U.S. Pat. No. 5,265,481A is that different signals can be transmitted via the same electrical signal conductor. Advantageously, a plurality of digital charge signals originating from different piezoelectric measuring elements or groups of piezoelectric measuring elements are transmitted by the WIM sensor to an evaluation element via the same electrical signal conductors. The connection in series of piezoelectric measuring elements achieved in this manner prevents constrictions in the profile like those occurring in U.S. Pat. No. 5,265,481A in the vicinity of sites where piezoelectric measuring elements are arranged. In this way, a better utilization of the space in the hollow profile of the WIM sensor is provided.

An increase in measurement accuracy of the WIM sensor as compared to U.S. Pat. No. 5,265,481A is achieved by calibrating the individual piezoelectric measuring elements of the WIM sensor. This is an advantage because if a WIM sensor is calibrated with only one calibration function for the entire \MM sensor, measurement errors will be encountered due to the fact that a wheel will not necessarily cross the WIM sensor at the same point with respect to the longitudinal direction of the WIM sensor whereby characteristic sensitivities, linearities and hysteresis of the individual piezoelectric measuring elements arranged along the longitudinal axis of the WIM sensor may affect the measurement result.

The digital charge signal of each individual piezoelectric measuring element or group of piezoelectric measuring elements is calibrated in an evaluation element by means of a calibration function.

In a further embodiment, at least one digital sensor signal of at least one sensor disposed in the WIM sensor is used for calibration.

An increase in measurement accuracy of the WIM sensor is also provided due to the spatial proximity of an electronic element comprising a charge amplifier to a piezoelectric measuring element. Long conductors increase the occurrence of interference signals and noise. Thus, the length of the electric charge conductors leading from a surface of a piezoelectric measuring element to a charge amplifier must be chosen as short as possible, advantageously shorter than 20 mm. This reduces the occurrence of interfering signals and is achieved by securing the electronic element on a support element in close proximity to and between the respective piezoelectric measuring elements.

Advantageously, an A/D converter is also located directly at the output of the charge amplifier; wherein the A/D converter converts the voltage signal of the charge amplifier into a digital charge signal which is less susceptible to external noise.

Simple mounting is achieved by a support element; said support element securing at least one piezoelectric measuring element; and said support element securing at least one electronic element. At least two support elements can be connected with each other to form a support. By means of the support, piezoelectric measuring elements and electronic elements of a WIM sensor can be easily inserted in a hollow profile in one piece.

BRIEF DESCRIPTION OF THE DRAWINGS

The accompanying drawings, which are incorporated in and constitute a part of this specification, illustrate at least one presently preferred embodiment of the invention as well as some alternative embodiments. The figures in these drawings, together with the written description, serve to explain the principles of the invention but by no means are intended to be exhaustive of all of the possible manifestations of the invention. Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

DETAILED DESCRIPTION OF EXEMPLARY EMBODIMENTS OF THE INVENTION

Figure 1:
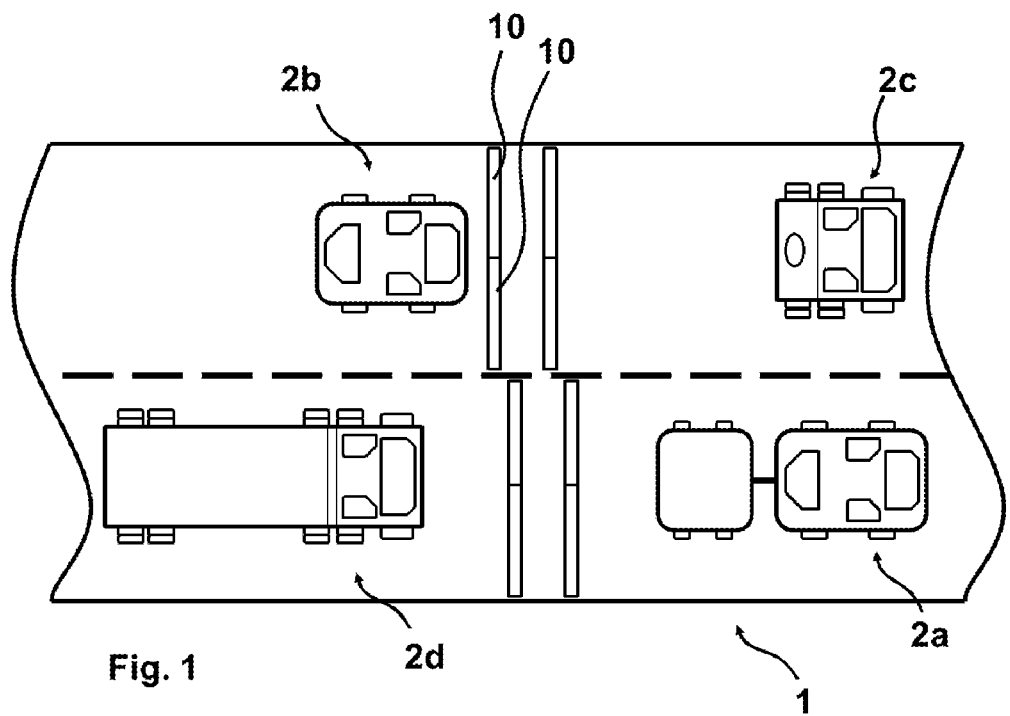
FIG. 1 shows a schematic partial view of a roadway segment with WIM sensors arranged therein.

Reference will now be made in detail to present exemplary embodiments of the invention, wherein one or more examples of which are illustrated in the accompanying drawings. The detailed description uses numerical and letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 schematically shows a roadway segment that is generally designated by the numeral 1. WIM sensors 10 are arranged in the roadway segment 1 and configured and disposed therein for determining wheel loads of a vehicle 2a, 2b, 2c, 2d traveling over the WIM sensor 10.

Figure 2:
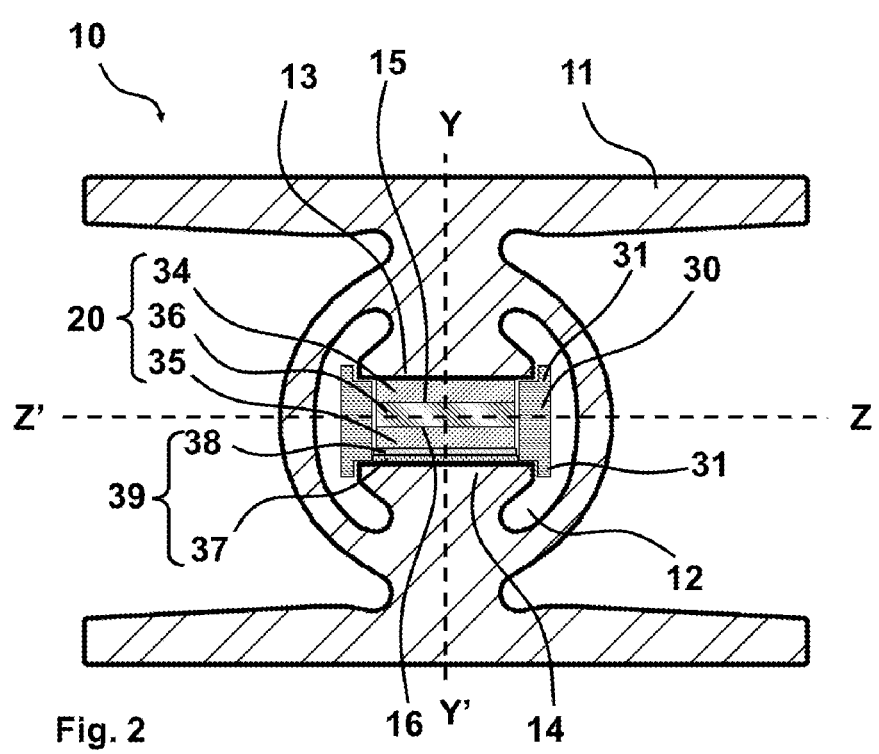
FIG. 2 shows a schematic sectional view of a WIM sensor in an advantageous embodiment.

Each WIM sensor 10 includes a hollow profile 11. In a presently preferred embodiment, the hollow profile 11 is made from a metal or a metal alloy. In a further embodiment, the hollow profile 11 is made of a plastic or a composite material. FIG. 2 shows a schematic sectional view of a WIM sensor 10 in an advantageous embodiment in an YY'-ZZ' plane that cuts transversely through the WIM sensor 10. The axis Y-Y' is parallel to the height of the hollow profile 11 and perpendicular to the roadway surface on which the vehicles 2a, 2b, 2c, 2d are traveling. The axis Z-Z' is parallel to the width of the hollow profile 11 and parallel to the nominal direction of travel of the vehicles 2a, 2b, 2c, 2d crossing the profile. The transverse dimension of the profile 11 is measured in direction of the Z-Z' axis. The profile 11 elongates along the direction of the X-X' axis, which is not shown in FIG. 2, but which is parallel to the length of the hollow segment 11 and perpendicular to both the Y-Y' axis and the Z-Z' axis. Thus, the axes X-X', Y-Y' and Z-Z' form an orthogonal coordinate system.

In an advantageous embodiment schematically shown in FIG. 2, the hollow profile 11 defines a space 12. The profile also defines within the space 12, a first pressing surface 13 and a second pressing surface 14. The pressing surfaces 13, 14 are spaced apart from each other and face towards each other so that they are opposing each other along the Y-Y' axis. The gap between the pressing surfaces 13, 14 is a uniform distance so that the pressing surfaces 13, 14 are parallel to each other.

As schematically shown in FIG. 2, WIM sensor 10 includes a piezoelectric measuring element arrangement 20 disposed in the space 12 of the hollow profile 11. The piezoelectric measuring element arrangement 20 includes a piezoelectric measuring element 36 that is sandwiched between a first force introduction element 34 and a second force introduction element 35.

As schematically shown in FIG. 2, the piezoelectric measuring element 36 comprises a first force-receiving surface 15 and a second force-receiving surface 16. The first force-receiving surface 15 faces the first pressing surface 13, and the second force-receiving surface 16 faces the second pressing surface 14. In an advantageous embodiment, piezoelectric measuring elements 36 are single crystals, which in a presently preferred embodiment are quartz crystals.

The first force introduction element 34 is arranged between the first pressing surface 13 and the first force-receiving surface 15. The second force introduction element 35 is arranged between the second pressing surface 14 and the second force-receiving surface 16. Each force introduction element 34, 35 is completely or partially made of an electrically conductive material, such as metal, metal alloys, crystal or ceramic with an electrically conductive layer which is applied to the crystal or the ceramic by material bonding.

By means of each force introduction element 34, 35, a force from the pressing surface 13, 14 indirectly acts onto the force-receiving surface 15, 16.

In a further embodiment, the piezoelectric measuring element arrangement 20 only comprises a piezoelectric measuring element 36. The explanations given hereinafter for this embodiment are to be understood in a sense that by elimination of the force introduction elements 34, 35, then the respective quantities, elements or properties directly act onto the force-receiving surfaces 15, 16 of the piezoelectric measuring element 36.

As schematically shown in FIG. 2, an electrode film 39 is arranged between at least one pressing surface 13, 14 and a force-receiving surface 15, 16. The electrode film 39 is an elongated insulating film 37 in the form of a strip made of an electrically non-conductive material, which is provided on at least one of its two surfaces with an electrically conductive layer 38. Advantageously, a substance or a combination of the following substances is used as the electrically conductive layer 38: chromium, copper, zirconium, gold, silver, platinum, steel. As schematically shown in FIG. 2, advantageously, a polyimide film is used as an insulating film 37.

The electrically conductive layer 38 is permanently mechanically connected to the insulating film 37. The mechanical connection may be effected by various methods. Thus, the electrically conductive layer 38 may be laminated to the insulating film 37; wherein lamination is understood to mean a thermal material-joining process. Furthermore, the electrically conductive layer 38 may be adhesively bonded to the insulating film 37 by means of an adhesive between the layer and the insulating film 37. Furthermore, the electrically conductive layer 38 may be adhesively bonded to the insulating film 37 by bringing the insulating film 37 by pressure or heat supply into a viscous state in which the electrically conductive layer 38 is adhesively bonded to the insulating film 37. In a presently preferred embodiment, the electrically conductive layer 38 is applied to the insulating film 37 by thermal vapor deposition, cathode sputtering or electroplating.

Figure 7:
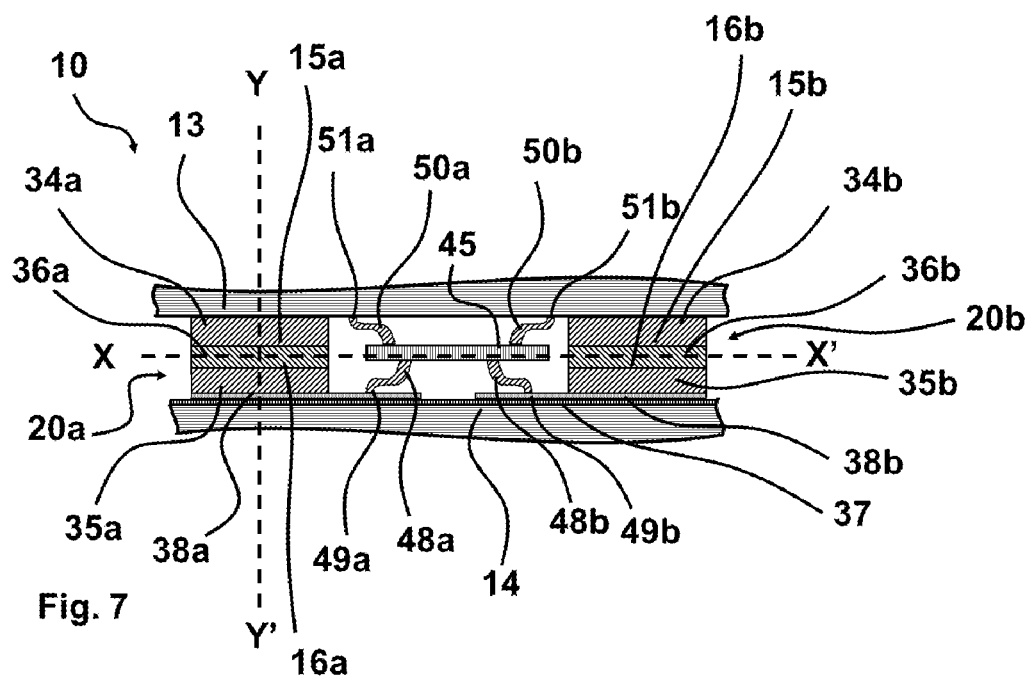
FIG. 7 shows a schematic sectional view of a portion of a WIM sensor in an advantageous embodiment wherein for clarity the support element is not shown.

As schematically shown in FIG. 7, on at least one side of the insulating film 37, the electrically conductive layer 38 has a structure that is formed in a way that defines various electrically conductive regions 38a, 38b that are electrically insulated from each other. The structure of the electrically conductive layer 38 desirably is achieved by selective application of the layer 38 on defined areas of the insulating film 37. Alternatively, a continuous electrically conductive layer 38 is applied first on the insulating film 37 and the structure with electrically conductive regions 38a, 38b that are electrically insulated from each other is introduced in a further step. Thus, in this alternative manner of defining the structure, electrically conductive regions 38a, 38b of the electrically conductive layer 38 may be removed by mechanical methods or selective etching of the electrically conductive layer 38. Additionally, the electrically conductive regions 38a and 38b of the electrode film 39 can be electrically insulated from one another by a region of the insulating film 37 that is coated by an electrically non-conductive coating.

It is understood that the person skilled in the art may also use a combination of said methods to achieve the positive connection between the insulating film 37 and the electrically conductive layer 38.

It is understood that the person skilled in the art may also use a combination of said methods to form a structure in the electrically conductive layer 38 of the electrode film 39.

In an advantageous embodiment shown schematically in FIG. 7, the piezoelectric measuring element 36 is defined by two piezoelectric measuring elements 36a, 36b that are spaced apart from each other in the longitudinal direction of the XX' axis along the length of the profile 11. This enables selective contacting of a piezoelectric measuring element 36a, 36b and, thus, the evaluation of the individual charge signals of the piezoelectric measuring elements 36a, 36b separately when a force acts onto a respective piezoelectric measuring element 36a, 36b.

Figure 3:
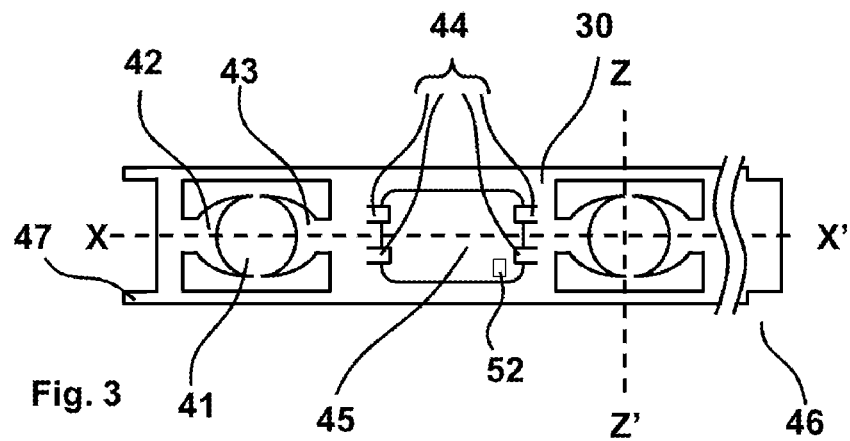
FIG. 3 shows a schematic partial view of a support element in a first embodiment.

As schematically shown in FIG. 2, the hollow profile 11 includes a support element 30 that is disposed in the space 12. FIG. 3 schematically depicts a first advantageous embodiment of the support element 30. Support element 30 is formed in an elongated manner extending along the longitudinal axis X-X' of the length of the profile 11. As schematically shown in FIG. 2, the support element 30 is advantageously wider than the piezoelectric measuring element arrangement 20 along the transverse Z-Z' axis of the hollow profile 11.

In an advantageous embodiment schematically shown in FIG. 3, the support element 30 defines at least one recess 41, which passes through the support element 30 along the height axis Y-Y'. The recess 41 is defined by holding clamps 42, 43, which are disposed in opposition to each other and configured to secure a piezoelectric measuring element arrangement 20 between them and to the support member 30.

The WIM sensor 10 desirably includes an electronic element 45. In an advantageous embodiment schematically shown in FIG. 3, the support element 30 defines at least one holding element 44; which is configured and disposed so as to mechanically connect an electronic element 45 to the support element 30. This connection desirably is effected by form closure or force closure. Thus, in one embodiment the electronic element 45 is mechanically firmly secured to the support element 30 by means of holding elements 44 in the form of flexible hooks. In a further embodiment, the electronic element 45 is mechanically firmly secured to the support element 30 by means of holding elements 44 in the form of screws, screw holes in the support element 30 and nuts; or in the form of screws and threaded holes in the support element 30.

In a further embodiment, the electronic element 45 is connected to the support element 30 by material bonding, for example with a suitable adhesive, in which case no holding elements 44 are necessary.

Figure 4:
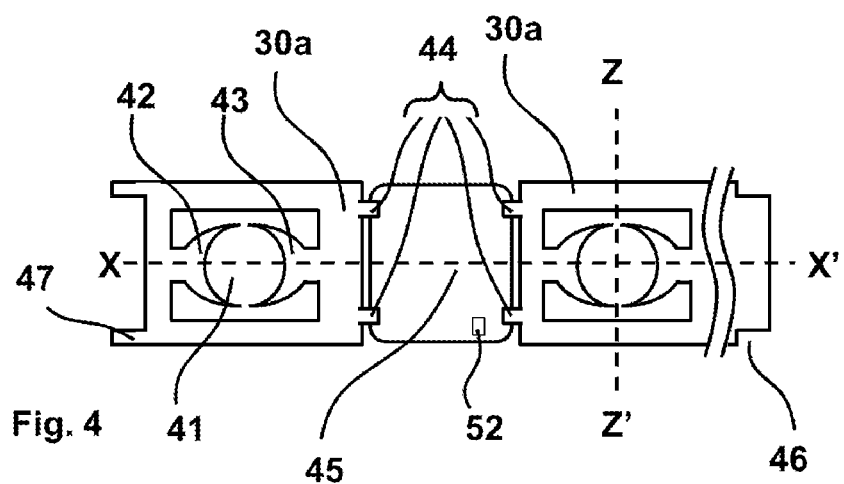
FIG. 4 shows a schematic partial view of a support element in a second embodiment.

In a second embodiment which is schematically shown in FIG. 4, the support element 30a is formed as at least two individual parts that are mechanically connected to the electronic element 45 by holding elements 44. In an advantageous embodiment, the electronic element 45 includes a mechanically rigid structure, for example a circuit board. In this embodiment of the support element 30a, the electronic element 45 is a structural component of support element 30a.

Figure 5:
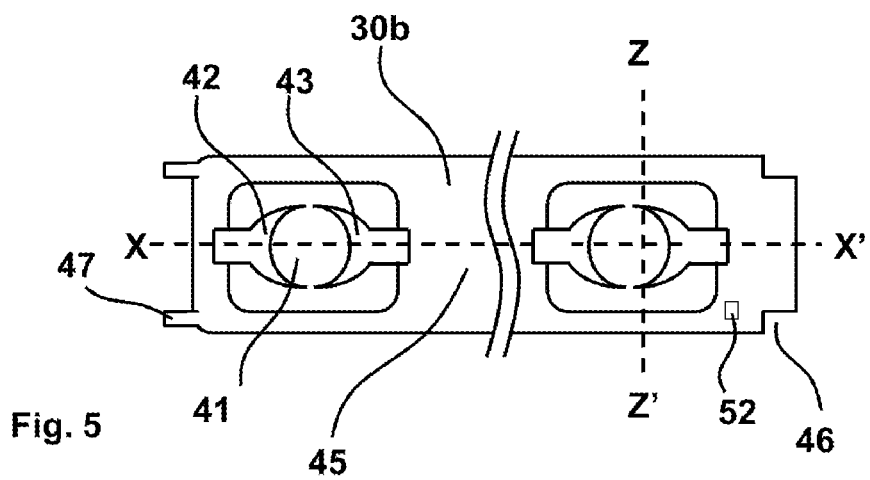
FIG. 5 shows a schematic partial view of a support element in a third embodiment.

As schematically shown in FIG. 5, in a third embodiment, a major portion of the support element 30b is formed by an electronic element 45, for example a circuit board, having at least one recess 41. Recess 41 in the electronic element 45 comprises holding clamps 42, 43 which are connected to the electronic element 45 by material bonding, form or force closure. Holding clamps 42, 43 secure the piezoelectric measuring element arrangement 20 with respect to the support element 30b.

In advantageous embodiments as shown respectively in FIG. 3, FIG. 4, and FIG. 5, the respective support element 30, 30a, 30b comprises connecting elements 46, 47 at the respective ends of the support element 30, 30a, 30b with respect to the axis X-X'. The pin-shaped connecting elements 46 defined at one opposite end of each support element 30, 30a, 30b are configured to be received in the slot-shaped connecting elements 47 defined at the other opposite end of each support element 30, 30a, 30b wherein the connecting elements 46, 47 connect the support elements 30, 30a, 30b by means of form closure.

In a further embodiment, the support element 30, 30a, 30b defines connecting elements that are configured for connecting the support elements 30, 30a 30b by force closure. A connection of support elements by force closure is for example achieved by means of screw connections.

Figure 6:
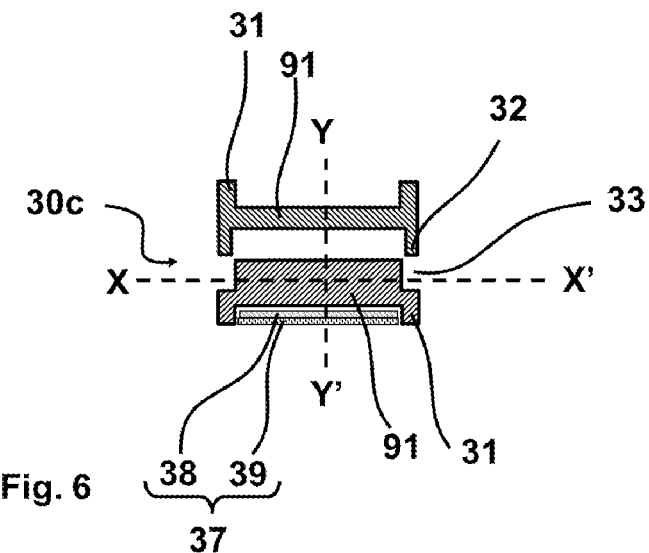
FIG. 6 shows a schematic sectional view of a portion of a support element in an embodiment wherein for clarity a distance with respect to the axis Y-Y' is inserted between the individual elements.

In a further embodiment schematically shown in FIG. 6, a support element 30c is assembled from a plurality of support element parts 91, wherein the connection of a plurality of support element parts 91 is achieved by form closure, force closure or material bonding. Thus, FIG. 6 schematically shows for example a support element 30c consisting of two support element parts 91 that are connected by force or form closure by means of part connection elements 32, 33. In the embodiment shown schematically in FIG. 6, the part connecting elements 32, 33 are in the form of pins 32 and slots 33, which may be connected to each other by form closure. In a further embodiment, the part connection elements 32, 33 may also be formed as a screw connection.

In an embodiment in which the support element parts 91 are connected by means of material bonding, the respective part connecting elements 32, 33 may be omitted.

It should be understood that also other embodiments of a support element 30 are conceivable. For example, the person skilled in the art may use a combination of the embodiments shown in FIGS. 3 to 5, introduce further elements for increasing the stability of a support element 30, or arrange elements in a different position. Thus, the electronic element 45 may not be arranged as described in the plane defined by X-X', Z-Z', but also in the plane defined by X-X', Y-Y' laterally on a support element 30.

In an advantageous embodiment, as illustrated in FIG. 2 for example, the support element 30, 30a, 30b, 30c define guide elements 31, which are configured and disposed to facilitate the mounting of the support 30 or 30a, 30b, 30c.

Figure 8:
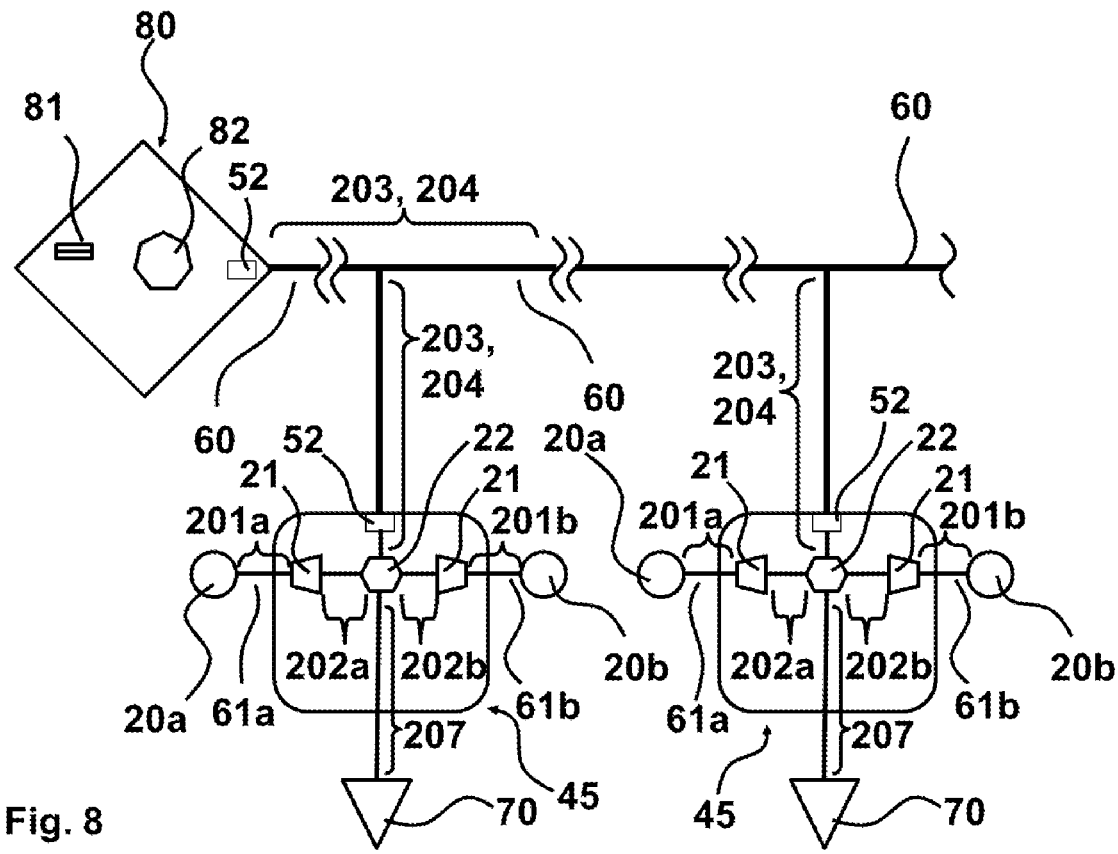
FIG. 8 shows a schematic representation of the electrical signal conductors of a WIM sensor in a presently preferred embodiment which electrical signal conductors electrically connect the evaluation element and at least one electronic element and at least one sensor; and electric charge conductors of a WIM sensor in a presently preferred embodiment which charge conductors electrically connect piezoelectric measuring elements to an electronic element.

FIG. 8 schematically shows a plurality of electrical signal conductors 60. As shown in FIGS., 3 to 5, the electronic element 45 comprises at least one connection element 52. By means of the connection element 52, it is possible to establish an electrical connection between at least two electronic elements 45 via electrical signal conductors 60. As schematically shown in FIG. 8, electrical signal conductors 60 connect the electronic elements 45 of a support element 30, 30a, 30b 30c or of different support elements 30, 30a, 30, 30c by means of the connection element 52.

Figure 10:
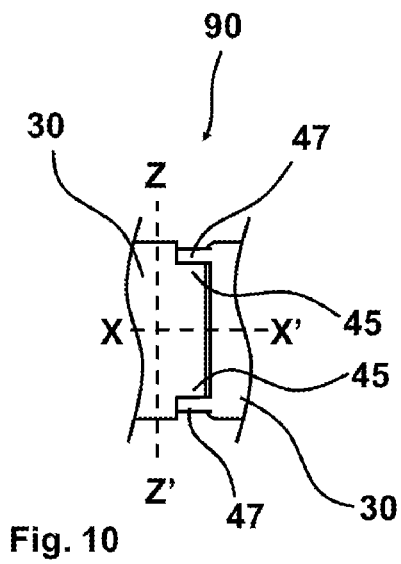
FIG. 10 shows a schematic representation of a support.

In the following, the totality of support elements 30, 30a, 30b, 30c when connected by force closure, form closure or material bonding within the space 12 of a hollow profile 11 is referred as a support 90, which is illustrated schematically in FIG. 10.

In accordance with one aspect of the present invention, a support 90 is configured to significantly facilitate the process of assembling a WIM sensor 10. A WIM sensor 10 is advantageously assembled according to a method described below: Each support 90, which includes connectable support elements 30, 30a, 30b, 30c, is pre-assembled outside the hollow profile 11 so as to include at least one piezoelectric measuring element arrangement 20 20a, 20b and at least one electronic element 45. In addition, as schematically shown in FIG. 8, the pre-assembly comprises an electrical connection of all electronic elements 45 of a WIM sensor 11 by means of a connecting element 52 and electrical signal conductor 60.

Furthermore, the electrode film 39 is inserted into a suitable element of the support such that the electrode film 39 does not slip sideways with respect to the transverse axis Z-Z'. For example, the guide elements 31 serve for this function.

A preassembled support 90 is inserted into a clamped hollow profile 11 together with at least one electrode film 39; wherein the distance of the pressing surfaces 13, 14 of the hollow profile 11 is increased by a force acting laterally along the transverse axis Z-Z' on the hollow profile 11. The guide elements 31 enable simple insertion of the support 90 in the hollow profile 11 and ensure precise positioning of the support 90 and the electrode film 39 within the hollow profile 11.

Advantageously, the support element 30, 30a, 30b, 30c has a length along the axis X-X' of between 100 mm and 1000 mm, in a particularly advantageous embodiment between 100 mm and 300 mm. In a particularly advantageous embodiment, the support element 30, 30a, 30b, 30c can therefore be used for mounting supports 90 of various lengths and, thus, for various designs regarding the length of a WIM sensor 10. The support 90 is thus afforded a length versatility that derives from the way that the support elements 30, 30a, 30b, 30c can be connected together in any desired length, and this length versatility of the support 90 reduces the manufacturing costs of a WIM sensor 10.

FIG. 7 shows a portion of a fully assembled WIM sensor 10 in a schematic sectional view in the XX'-YY' plane in which the support element 30 30a, 30b, 30c has been omitted for the sake of clarity. In an advantageous embodiment, the electronic element 45 comprises at least one spring contact 48a, 48b on its bottom side with respect to the axis Y-Y'. Each spring contact 48a, 48b has a defined spring force. In the mounted state of the WIM sensor 10 schematically shown in FIG. 7, the respective spring contact 48a, 48b presses a respective spring contact surface 49a, 49b against a surface, for example a respective electrically conductive region 38a, 38b of the structured electrode film 39, and in this way firmly secures the respective spring contact 48a, 48b to the electronic element 45 with the aforementioned defined spring force.

In an advantageous embodiment schematically shown in FIG. 7, the WIM sensor 10 further comprises at least one spring contact 50a, 50b that rests against the upper side of the electronic element 45 with respect to the axis Y-Y'. Each spring contact 50a, 50b has a defined spring force. In the mounted state of the WIM sensor 10 schematically shown in FIG. 7, the respective spring contact 50a, 50b presses a respective spring contact surface 51a, 51b against a surface, for example a pressing surface 13 of the hollow profile 11, and in this way firmly secures the respective spring contact 50a, 50b to the electronic element 45 with the aforementioned defined spring force.

By pressing against the respective spring contact surfaces 49a, 51a schematically shown in FIG. 7, the respective spring contacts 48a, 50a establish an electrical connection between the electronic element 45 and the piezoelectric measuring element 20a. In an advantageous embodiment schematically shown in FIG. 7, when a force acts onto the piezoelectric measuring element 36a, the electric charges generated on a second force-receiving surface 16a are transmitted via the force introduction element 35a, electrically conductive region 38a of the electrode film and spring element 48a to the electronic element 45. Thus, the force introduction element 35a, electrically conductive region 38a of the electrode film and spring element 48a schematically shown in FIG. 7 form a charge conductor 61a, which is schematically represented in FIG. 8. The electric charges generated on a first force-receiving surface 15a when a force acts onto the piezoelectric measuring element 36a are transmitted to the electronic element 45 via the force introduction element 34a, pressing surface 13 and spring element 50a. Thus, the force introduction element 34a, pressing surface 13 and spring element 50a schematically shown in FIG. 7 form a charge conductor 61a, which is schematically represented in FIG. 8.

Similarly, by pressing against the respective spring contact surfaces 49b, 51b the respective spring contacts 48b, 50b establish an electrical connection between the electronic element 45 and the piezoelectric measuring element arrangement 20b. In an advantageous embodiment schematically shown in FIG. 7, when a force acts onto the piezoelectric measuring element 36b, the electric charges generated on a second force-receiving surface 16b are transmitted to the electronic element 45 via the force introduction element 35b, electrically conductive region 38b of the electrode film and spring element 48b. Thus, the force introduction element 35b, electrically conductive region 38b of the electrode film and spring element 48b schematically shown in FIG. 7 form a charge conductor 61b, which is schematically shown in FIG. 8. The electric charges generated on a first force-receiving surface 15b when force is applied to the piezoelectric measuring element 36b are transmitted via the force introduction element 34b, pressing surface 13 and spring element 50b to the electronic element 45. Thus, the force introduction element 34b, pressing surface 13 and spring element 50b schematically shown in FIG. 7 form a charge conductor 61b, which is schematically shown in FIG. 8.

In a further embodiment, at least two piezoelectric measuring elements 36 are contacted in parallel by means of a region of an electrically conductive layer of an electrode film. In the following description, a group of piezoelectric measuring elements refers to at least two piezoelectric measuring element arrangements 20 contacted in parallel.

In another embodiment (not shown), an additional electrode film is arranged between the force introduction element 34a, 34b and the pressing surface 13; wherein the additional electrode film electrically insulates the pressing surface 13 against the force introduction element 34; wherein an electrically conductive layer is applied on the side of the insulating film that faces the force introduction element 34a, 34b in a manner known per se: wherein the electric charges generated on a respective first force-receiving surface 15a, 15b when a force is applied to the respective piezoelectric measuring element 36a, 36b are transmitted to the electronic element 45 via the respective force introduction element 34a, 34b, the electrically conductive layer of the additional electrode film and the respective spring element 50a, 50b.

The additional electrode film comprises on at least one side thereof a continuous electrically conductive layer or a structured electrically conductive layer similar to the electrode film 39.

In a presently preferred embodiment, the support element 30, 30a, 30c, 30c comprises an electronic element 45 each interposed between two piezoelectric measuring element assemblies 20a, 20b, as shown in FIG. 3, FIG. 4 and FIG. 5. In an advantageous embodiment, as schematically shown in FIG. 8, at least one charge amplifier 21 is arranged on the electronic element 45 and configured for converting the charge signal 201a, 201b of a piezoelectric measuring element arrangement 20a, 20b or group of piezoelectric measuring elements into an electrical voltage that is proportional to the charge signal 201a, 201b or into a current that is proportional to the charge signal 201a, 201b. Hereinafter, the electric voltage proportional to the charge signal 201a, 201b or the current proportional to the charge signal 201a, 201b will be referred to as the charge amplifier signal 202a, 202b. Moreover, in an advantageous embodiment schematically shown in FIG. 8, at least one A/D converter 22 is arranged on the electronic element 45 converting the charge amplifier signal 202a, 202b into a digital charge signal 203 and providing said signal.

In the following description, "providing a signal" is to be understood as meaning that the signal that is provided is available for further use. Therefore, "providing" in this context also means storing of the signal in an electronic memory and retrieving the signal from that electronic memory. Providing in this context also includes displaying the signal on a display.

It should be understood that an A/D converter 22 is not limited to an electronic component having exactly one signal input and exactly one signal output. Those skilled in the art are familiar with an electronic component comprising a plurality of signal inputs and a plurality of signal outputs which convert a plurality of input signals into a plurality of digital output signals. Accordingly, an A/D converter 22 also refers to a pair consisting of a signal input and a signal output of an electronic component in which several signal inputs and several signal outputs are disposed.

It should be understood that electronic components having different functions, such as an A/D converter 22 and a charge amplifier 21, may be included together in one electronic component, for example in the form of an application-specific integrated circuit, briefly ASIC. For simplicity, the following description will still refer to an A/D converter and a charge converter even if they should be present in the form of an ASIC.

In an advantageous embodiment schematically shown in FIG. 8, the WIM sensor 10 comprises an evaluation element 80. The evaluation element 80 is arranged in a space 12 of the hollow profile 11. Digital charge signals 203 of piezoelectric measuring element arrangements 20, 20a, 20b or groups of piezoelectric measuring elements are accessible for evaluation in the evaluation element 80.

Advantageously, at least one microprocessor 82 as well as at least one non-volatile memory element 81 and at least one connection element 52 for an electrical signal conductor 60 are arranged on the evaluation element 80. Furthermore, an electrical signal conductor 60 connects at least one connection element 52 of an electronic element 45 to an evaluation element 80.

Advantageously, by using digital signals, an electrical signal conductor 60 can employ fewer electrical conductors than the number of signals that will be available for transmission.

Digital charge signals 203 of the electronic elements 45 of a WIM sensor 10 are accessible for evaluation in an evaluation element 80 by means of the connection elements 52 and the electrical signal conductors 60.

In a further embodiment, connection element 52 serves for the power supply of an electronic element 45.

In another embodiment schematically shown in FIG. 8, at least one sensor 70 is arranged in a space 12 of the hollow profile 11, which sensor 70 measures a physical parameter which it outputs as a sensor signal 207. An A/D converter 22 converts the sensor signal 207 into a digital sensor signal 204 and provides the digital sensor signal 204 to a connection unit 52. The sensor 70 measures one of the following physical parameters: temperature, acoustic waves, acceleration.

In a further embodiment, at least one digital sensor signal 204 is additionally available for evaluation in an evaluation element 80 by means of the connection unit 52 and an electrical signal conductor 60.

Figure 9:
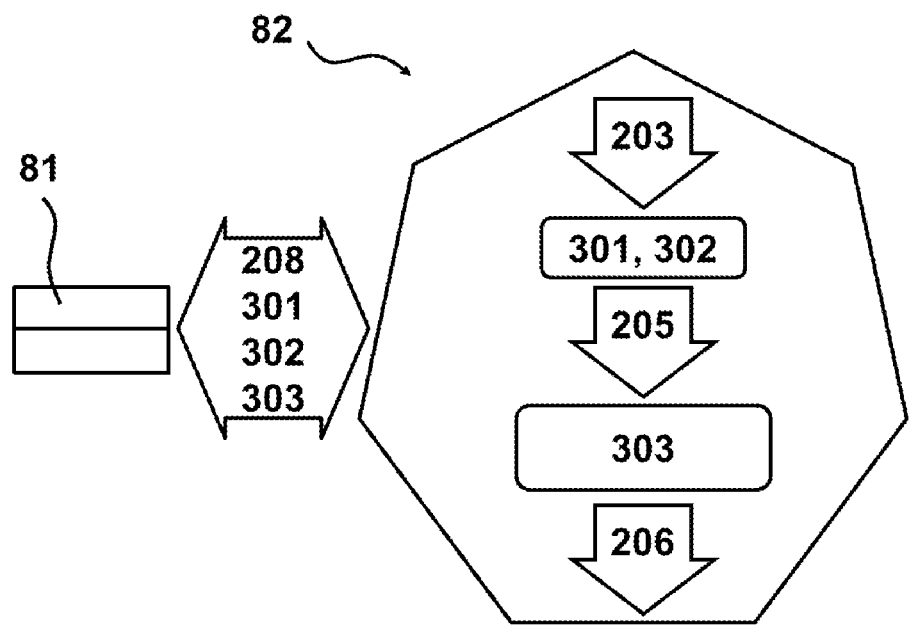
FIG. 9 shows a schematic representation of the processes performed in the evaluation element.

In an advantageous embodiment schematically shown in FIG. 9, at least one digital charge signal 203 in the evaluation element 80 is calibrated by means of a calibration function 301. The calibration function 301 is a mathematical function comprising at least one variable.

In a presently preferred embodiment schematically shown in FIG. 9, the calibration function 301 is stored on the nonvolatile memory element 81 and is loaded into the microprocessor 82.

The calibration function 301 utilizes a plurality of parameters 302, which parameters 302 correspond to characteristic properties of a piezoelectric measuring element 36, 36a, 36b. These characteristic properties include at least the following: a sensitivity and a linearity of a piezoelectric measuring element 36, 36a, 36b. In this respect, a parameter 302 has one or more numerical values and can be unambiguously assigned to a particular piezoelectric measuring element 36, 36a, 36b. The linearity and sensitivity were previously determined for that piezoelectric measuring element 36, 36a, 36b.

Preferably, the calibration function is a polynomial of finite degree. A polynomial sums the multiples of powers of a variable. For each power of the variable, the multiple is given by a coefficient that is multiplied by the power of the variable. The coefficients represent parameters 302.

Using the digital charge signal 203 of a piezoelectric measuring element 36, 36a, 36b as the variable, the calibration function 301 generates a calibrated digital charge signal 205, as illustrated schematically in FIG. 9. The calibration function 301 is selected such that there is a linear relationship between the calibrated digital charge signal 205 and the wheel load acting on the piezoelectric measuring element 36, 36a, 36b. This serves to increase the measurement accuracy when determining a wheel load from a wheel of a crossing vehicle that acts on a piezoelectric measuring element 36, 36a, 36b of a WIM sensor 10.

Preferably, the calibration function 301 and the parameters 302 are determined by means of a method wherein defined forces of different amounts are exerted one after the other onto the piezoelectric measuring element 36, 36a, 36b and the digital charge signal 203 is recorded. In this method, an algorithm first determines the interpolation polynomial that results in the forces that were applied in the method using the digital charge signal 203 as a variable which is performed by means of polynomial interpolation known from numerical mathematics. This interpolation polynomial is the calibration function 301 which generates the calibrated digital charge signal 205 with the digital charge signal 203 as a variable. The sensitivity is given directly by the coefficient of the linear term of the polynomial. The linearity is given by the further coefficients of the polynomial.

Those skilled in the art, however, are able choose another mathematical form of the calibration function 301 and to select a different method for determining the calibration function.

In a presently preferred embodiment schematically shown in FIG. 9, the calibration function 301 is stored on the non-volatile memory element 81 associated with a time stamp 208 wherein a time stamp 208 consists of a date and time and is provided by an algorithm in the microprocessor 82.

The stored calibration function 301 is adapted in the course of a new determination of the calibration function 301 by means of the method described hereinabove, thereby replacing the calibration function 301 stored previously on the non-volatile memory element 81. However, the previous calibration function 301 is still archived on the non-volatile memory element 81.

A calibration function 301 for each of the piezoelectric measuring elements 36, 36a, 36b is stored on the non-volatile memory element 81.

From a time course of the calibration functions 301 archived together with a time stamp 208, it advantageously becomes possible to determine the performance of the WIM sensor 10, aging effects on the piezoelectric measuring element 36, 36a, 36b or aging effects and condition of the road surface 2 of the roadway segment 1.

When determining a wheel load exerted by a wheel of a crossing vehicle 2, 2', 2", 2''' on a piezoelectric measuring element 36, 36a, 36b of a WIM sensor 10, an increase in measurement accuracy also can be achieved in a different way using another embodiment of the calibration function 301. In contrast to the embodiment of the calibration function 301 described hereinabove, the calibration function 301 in the embodiment described below and illustrated schematically in FIG. 9 generates a calibrated digital charge signal 205 from the digital sensor signal 204 of a sensor 70 detecting the temperature of the piezoelectric measuring element 36, 36a, 36b as a variable, and from the digital charge signal 203 of a piezoelectric measuring element 36, 36a, 36b. Accordingly, a sensor 70 that detects temperature is required for this embodiment of the calibration function 301. The parameters 302 of the calibration function 301 are at least the sensitivity and the linearity and a temperature relationship of the piezoelectric measuring element 36, 36a, 36b, which linearity and sensitivity and temperature relationship have already been determined previously for the piezoelectric measuring element 36, 36a, 36b. From the digital sensor signal 204 and the digital charge signal 203, the calibration function 301 generates the calibrated digital charge signal 205. Ideally, there is a linear relationship between the calibrated digital charge signal 205 and the wheel load acting on the piezoelectric measuring element 36, 36a, 36b, and the calibrated digital charge signal 205 is independent of the temperature of the piezoelectric measuring element 36, 36a, 36b.

In a presently preferred embodiment illustrated schematically in FIG. 9, the microprocessor 82 of the evaluation element of the WIM sensor 10 assigns a separate calibration function 301 to each respective piezoelectric measuring element 36, 36a, 36b. Using the is respective assigned calibration function 301, the calibrated digital charge signal 205 of the piezoelectric measuring element 36, 36a, 36b is generated from the digital charge signal 203 of the piezoelectric measuring element 36, 36a, 36b.

In an advantageous embodiment illustrated schematically in FIG. 9, a total force function 303 is stored in the non-volatile memory element 81. The total force function 303 is a mathematical algorithm and is loaded into the microprocessor 82 and applied to all calibrated digital charge signals 205. Based on the total force function 303, the microprocessor 82 calculates the total force 206 exerted onto the roadway segment 1 by a wheel of a vehicle 2a, 2b, 2c, 2d crossing over the WIM sensor 10.

What is claimed is:

1. A WIM sensor for determining wheel loads of a wheeled vehicle traveling on a roadway segment that defines a roadway surface on which moves a crossing wheel of the wheeled vehicle, the WIM sensor comprising:
    a hollow profile that elongates to extend along a longitudinal axis thereof, the hollow profile defining an upper surface that is configured to be disposed flush with the roadway surface when the profile is arranged in the roadway segment, the hollow profile defining a first space enclosed within the hollow profile;
    a plurality of piezoelectric measuring elements disposed in the first space and arranged along said longitudinal axis, each said piezoelectric measuring element includes a first force-receiving surface and a second force-receiving surface, each piezoelectric measuring element is configured to generate on each first force-receiving surface and each second force-receiving surface thereof electric charges that are proportional to the wheel load exerted on the respective piezoelectric measuring element;
    a support element disposed in the first space so as to secure at least one piezoelectric measuring element;
    an electronic element disposed in the first space and secured by the support element; and
    an electric charge conductor disposed in the first space and electrically connecting the electronic element and a respective first force-receiving surface of one of said plurality of piezoelectric measuring elements, wherein the electric charge conductor is configured for conducting a charge signal from the respective first force-receiving surface to the electronic element.

2. The WIM sensor according to claim 1, further comprising:
    an electrode film, a first force introduction element and a second force introduction element, each of the electrode film, the first force introduction element and the second force introduction element being disposed in the first space of the hollow profile;
    wherein in the first space the hollow profile defines a first pressing surface and a second pressing surface, which pressing surfaces are arranged opposite to each other; the first force-receiving surface faces the first pressing surface, the second force-receiving surface faces the second pressing surface, which respective pressing surface acts indirectly onto the respective force-receiving surface; wherein said indirect action of the pressing surfaces onto the force-receiving surfaces occurs by means of the first force introduction element and the second force introduction element, which force introduction elements are arranged between a pressing surface and a force-receiving surface; and
    an electrode film is arranged between the second force-receiving surface and the second pressing surface; said electrode film comprising an insulating film; wherein said insulating film includes an electrically insulating material; said insulating film electrically insulates the second force-receiving surface from the second pressing surface; the electrode film further comprises an electrically conductive layer on at least the side of the insulating film that faces the second force-receiving surface; the electrically conductive layer on the side of the insulating film that faces the second force-receiving surface is subdivided into at least two electrically conductive regions; and wherein the electrode film comprises an electrical insulation between said electrically conductive regions of the electrically conductive layer.

3. The WIM sensor according to claim 2, wherein at least one electrically conductive region of the electrode film is connected to the second force introduction element by force closure; the force closure of the second force introduction element and the electrically conductive of the electrode film generates an electrical contact between the second force introduction element and the electrically conductive region of the electrode film; by means of the second force introduction element an electrical contact is formed between the second force-receiving surface and the electrically conductive region; and wherein second force-receiving surfaces of different piezoelectric measuring elements are electrically insulated from each other due to the electrical insulation between electrically conductive regions.

4. The WIM sensor according to claim 3, further comprising:
    a first spring contact that defines a spring contact surface and is formed of material that is both elastic and electrically conductive;
    wherein the first spring contact is connected to the electronic element in an electrically conductive manner and prestressed between the electronic element and a contact surface defined by the hollow profile; the prestressed first spring contact exerts a defined mechanical spring force onto the contact surface by means of a spring contact surface; the spring contact surface is connected to the contact surface by force closure;

wherein the electronic element is connected in an electrically conductive manner to the contact surface by means of the spring contact and the connection by force closure between the contact surface and the spring contact surface; and in that the contact surface is an electrode film or a pressing surface of the hollow profile.

5. The WIM sensor according to claim 4, wherein a first electric charge conductor electrically connecting the first force-receiving surface of the piezoelectric measuring element and the electronic element is formed by the first spring contact, the electrical contact between the first spring contact and the first pressing surface of the hollow profile, the hollow profile, the electrical contact between the hollow profile and the first force introduction element, and the first force introduction element;

wherein the first electric charge conductor conducts a first charge signal;

wherein a second electric charge conductor electrically connecting the second force-receiving surface of the piezoelectric measuring element and the electronic element is formed by a second spring contact, the electrical contact between the second spring contact and the electrode film, the electrode film, the electrical contact between the electrode film and the second force introduction element, and the second force introduction element; and wherein the second electric charge conductor conducts a second charge signal.

6. The WIM sensor according to claim 5, wherein the electronic element secured to the support element includes a charge amplifier and an A/D converter;

wherein the charge amplifier is configured to convert the charge signal of a piezoelectric measuring element into a charge amplifier signal;

wherein the A/D converter is configured to convert the charge amplifier signal into a digital charge signal; and wherein the A/D converter provides the digital charge signal as an output signal.

7. The WIM sensor according to claim 6, wherein the charge amplifier of the electronic element is disposed at a distance not more than 20 mm from the first force-receiving surface or the second force-receiving surface of the piezoelectric measuring element.

8. The WIM sensor according to claim 6, further comprising:

an evaluation element is arranged in the first space;

a connection element for an electrical signal conductor is arranged on the evaluation element;

a connection element for the electrical signal conductor is arranged on the electronic element;

a second electronic element disposed in the first space and secured by the support element; and wherein the electrical signal conductor electrically connects the connection element of the evaluation element and the connection elements of the electronic element and the second electronic element in series; and wherein the electronic element and the second electronic element transmit the digital charge signals provided via the electrical signal conductor to the evaluation element.

9. The WIM sensor according to claim 8, further comprising:

a sensor is arranged in the first space;

wherein the sensor is configured to measure a physical parameter as the sensor signal;

wherein the A/D converter is configured to convert the sensor signal into a digital sensor signal and provide digital sensor signal at the connection element; and wherein the digital sensor signal provided is available in the evaluation element via the electrical signal conductor.

10. The WIM sensor according to claim 1, wherein the support element defines a plurality of support element parts; and wherein the support element parts are connected to one another by force closure or by material bonding.

11. A method of calibrating a WIM sensor according to claim 6, the method comprising the steps of:

determining the sensitivity of the piezoelectric measuring element;

determining the linearity of the piezoelectric measuring element;

employing a calibration function that is a mathematical function being a polynomial of finite degree, said polynomial containing coefficients, said coefficients representing parameters, which parameters can be unambiguously assigned to the piezoelectric measuring element;

using as the parameters the determined sensitivity and the determined linearity of the piezoelectric measuring element;

wherein the calibration function is configured to use a digital charge signal of a piezoelectric measuring element as a variable to generate a calibrated digital charge signal;

wherein the calibration function is configured to generate a linear relationship between the wheel load acting on the piezoelectric measuring element and the magnitude of the calibrated digital charge signal so as to increase a measurement accuracy in the WIM sensor's determination of the wheel load.

12. A method of calibrating a WIM sensor according to claim 11, the method comprising the steps of:

determining the sensitivity of the piezoelectric measuring element;

determining the linearity of the piezoelectric measuring element;

using a temperature sensor to determine the temperature dependence of the piezoelectric measuring element;

employing a calibration function that is a mathematical function being a polynomial of finite degree containing polynomial coefficients that represent parameters, which parameters can be unambiguously assigned to the piezoelectric measuring element;

using as the parameters the determined sensitivity, the determined linearity and the determined temperature dependence of the piezoelectric measuring element;

wherein the calibration function is configured to use a digital charge signal of a piezoelectric measuring element and a digital sensor signal from the temperature sensor as variables to generate a calibrated digital charge signal;

wherein the calibration function is configured to generate a linear relationship between the wheel load acting on the piezoelectric measuring element and the magnitude of the calibrated digital charge signal so as to minimize the dependence of the calibrated digital charge signal from the temperature of the piezoelectric measuring element and increase a measurement accuracy in the WIM sensor's determination of the wheel load.

13. The method of calibrating a WIM sensor according to claim 11, wherein the calibration function is determined according to an algorithm, wherein defined forces of different amounts are applied one after the other onto the piezoelectric measuring element and the digital charge signal corresponding to the defined force is determined according to the algorithm; wherein polynomial interpolation known from numerical mathematics is used to determine the interpolation polynomial resulting in said forces using the digital charge signal as a variable; wherein said interpolation polynomial is the calibration function which generates the calibrated digital charge signal using the digital charge signal as a variable; wherein the determined calibration function is saved together with a time stamp on a non-volatile memory element.

14. A method for producing a WIM sensor according to claim 1, wherein two support elements are connected by form or force closure by means of at least two connecting elements to form a support, said connecting elements comprising the support elements at at least one end thereof; the support consists of at least two support elements connected to one another; and in that the support is easily inserted in a clamped hollow profile of a WIM sensor.

15. The method for producing a WIM sensor according to claim 14, wherein at least one electrode film is inserted in the clamped hollow profile together with the support.

16. The WIM sensor according to claim 1, further comprising:

an electrode film, a first force introduction element and a second force introduction element, each of the electrode film, the first force introduction element and the second force introduction element being disposed in the first space of the hollow profile;

wherein in the first space the hollow profile defines a first pressing surface and a second pressing surface, which pressing surfaces are arranged opposite to each other; the first force-receiving surface faces the first pressing surface, the second force-receiving surface faces the second pressing surface, which respective pressing surface acts directly onto the respective force-receiving surface; and an electrode film is arranged between the second force-receiving surface and the second pressing surface; said electrode film comprising an insulating film; wherein said insulating film includes an electrically insulating material; said insulating film electrically insulates the second force-receiving surface from the second pressing surface; the electrode film further comprises an electrically conductive layer on at least the side of the insulating film that faces the second force-receiving surface; the electrically conductive layer on the side of the insulating film that faces the second force-receiving surface is subdivided into at least two electrically conductive regions; and wherein the electrode film comprises an electrical insulation between said electrically conductive regions of the electrically conductive layer.

* * * * *